(12) United States Patent
Gdaliahu et al.

(10) Patent No.: US 11,843,523 B1
(45) Date of Patent: Dec. 12, 2023

(54) MICROSERVICES ANTI-PATTERN DISCOVERY

(71) Applicant: Dell Products L.P., Round Rock, TX (US)

(72) Inventors: Lior Gdaliahu, Modi'in (IL); Yonit Lopatinski, Shomria (IL); Roman Bober, Ashdod (IL); Eli Rosenes, Bet Shemesh (IL)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/934,362

(22) Filed: Sep. 22, 2022

(51) Int. Cl.
*H04L 41/50* (2022.01)
*H04L 67/50* (2022.01)
*G06F 11/34* (2006.01)

(52) U.S. Cl.
CPC ...... *H04L 41/5032* (2013.01); *G06F 11/3466* (2013.01); *H04L 67/50* (2022.05)

(58) Field of Classification Search
CPC ... H04L 41/5032; H04L 67/50; G06F 11/3466
See application file for complete search history.

(56) References Cited

U.S. PATENT DOCUMENTS

| | | | |
|---|---|---|---|
| 11,068,328 B1* | 7/2021 | Rafey | G06F 11/302 |
| 11,347,622 B1* | 5/2022 | Agarwal | G06F 3/0482 |
| 2018/0270122 A1* | 9/2018 | Brown | H04L 67/30 |
| 2020/0366574 A1* | 11/2020 | Schubert | H04L 41/5032 |
| 2022/0172067 A1* | 6/2022 | Kang | G06F 11/302 |

* cited by examiner

*Primary Examiner* — Bryan Y Lee
(74) *Attorney, Agent, or Firm* — Amin, Turocy & Watson, LLP

(57) ABSTRACT

A system can identify microservices calls. The system can, in response to identifying a first call, where the first call originates externally, storing, to logged calls, a first association between the first call, a response to the first call, a first entity that originated the first call, a second entity to which the first call is destined, a unique identifier, and a counter associated with the unique identifier, or where the first call originates internally, storing, to the logged calls, a second association between the first call, the response, the first entity, the second entity, the unique identifier, and the counter after incrementing the counter, wherein the unique identifier is identified by the first call. The system can order logged calls that share unique identifiers according to values of respective counters. The system can store a topology of the microservices that is generated according to the ordered logged calls.

20 Claims, 15 Drawing Sheets

600 ⬊

(602)

$M = \{C_i \to C_j \cup E_k \to C_i \cup C_i \to E_k \mid i,j \in \{1..n\}, k \in \{1..m\}]\}$
$\forall m \in M$ NEW CALL 604

$m: E_k \to C_i, C_i \in S, E_k \in E$ 606

$m: C_i \to E_k, C_i \in S, E_k \in E$ 608

$m: C_j \to C_i$ 610

$P = P \cup \{u_m, l, r, C_i, C_j\}$ 612

Waterfall antipattern flows = $\{F_u \in F(S), |F_u| > t\}$ 804

↓

$U_{iu} = \{(u, l, r, C_i) \in F_u\}$ 806

↓

$\exists u, so |U_{iu}| > t$ 808

FOR A FIRST CALL OF CALLS INVOLVING MICROSERVICES, WHERE THE FIRST CALL ORIGINATES FROM A SOURCE EXTERNAL TO THE MICROSERVICES, STORING, TO LOGGED CALLS, A FIRST ASSOCIATION BETWEEN THE FIRST CALL, A FIRST ENTITY THAT ORIGINATED THE FIRST CALL, A SECOND ENTITY TO WHICH THE FIRST CALL IS DESTINED, A UNIQUE IDENTIFIER, AND A COUNTER ASSOCIATED WITH THE UNIQUE IDENTIFIER, OR WHERE THE FIRST CALL ORIGINATES FROM THE MICROSERVICES, STORING, TO THE LOGGED CALLS, A SECOND ASSOCIATION BETWEEN THE FIRST CALL, THE FIRST ENTITY, THE SECOND ENTITY, THE UNIQUE IDENTIFIER, AND THE COUNTER AFTER INCREMENTING THE COUNTER, WHEREIN THE UNIQUE IDENTIFIER IS IDENTIFIED BY THE FIRST CALL 1404

GENERATING A TOPOLOGY OF THE MICROSERVICES BASED ON THE LOGGED CALLS 1406

MICROSERVICES ANTI-PATTERN DISCOVERY

BACKGROUND

Microservices can generally be a variant of a service-oriented architecture (SOA) computer architectural style that structures an application as a collection of loosely coupled services.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can identify calls involving microservices. The system can, in response to identifying a first call of the calls, where the first call originates from a source external to the microservices, storing, to logged calls, a first association between the first call, a response to the first call, a first entity that originated the first call, a second entity to which the first call is destined, a unique identifier, and a counter associated with the unique identifier, or where the first call originates from the microservices, storing, to the logged calls, a second association between the first call, the response, the first entity, the second entity, the unique identifier, and the counter after incrementing the counter, wherein the unique identifier is identified by the first call. The system can order respective logged calls of the logged calls that share respective unique identifiers according to respective values of respective counters to produce ordered logged calls. The system can store a topology of the microservices that is generated according to the ordered logged calls.

An example method can comprise identifying, by a system comprising a processor, calls involving microservices. The method can further comprise, in response to identifying a first call of the calls, where the first call originates from a source external to the microservices, storing, by the system and to logged calls, a first association between the first call, a response to the first call, a first entity that originated the first call, a second entity to which the first call is destined, a unique identifier, and a counter associated with the unique identifier, or where the first call originates from the microservices, storing, by the system and to the logged calls, a second association between the first call, the response, the first entity, the second entity, the unique identifier, and the counter after incrementing the counter, wherein the unique identifier is identified by the first call. The method can comprise generating, by the system, a topology of the microservices based on ordering respective logged calls of the logged calls that share respective unique identifiers according to respective values of respective counters.

An example non-transitory computer-readable medium can comprise instructions that, in response to execution, cause a system comprising a processor to perform operations. These operations can comprise for a first call of calls involving microservices, where the first call originates from a source external to the microservices, storing, to logged calls, a first association between the first call, a first entity that originated the first call, a second entity to which the first call is destined, a unique identifier, and a counter associated with the unique identifier, or where the first call originates from the microservices, storing, to the logged calls, a second association between the first call, the first entity, the second entity, the unique identifier, and the counter after incrementing the counter, wherein the unique identifier is identified by the first call. The operations can further comprise generating a topology of the microservices based on the logged calls.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates an example process flow for data collection, and that can facilitate microservices anti-pattern discovery, in accordance with an embodiment of this disclosure;

FIG. 8 illustrates an example process flow for identifying a waterfall anti-pattern, and that can facilitate microservices anti-pattern discovery, in accordance with an embodiment of this disclosure;

FIG. 14 illustrates another example process flow for microservices anti-pattern discovery, in accordance with an embodiment of this disclosure;

DETAILED DESCRIPTION

Overview

Figure 1:
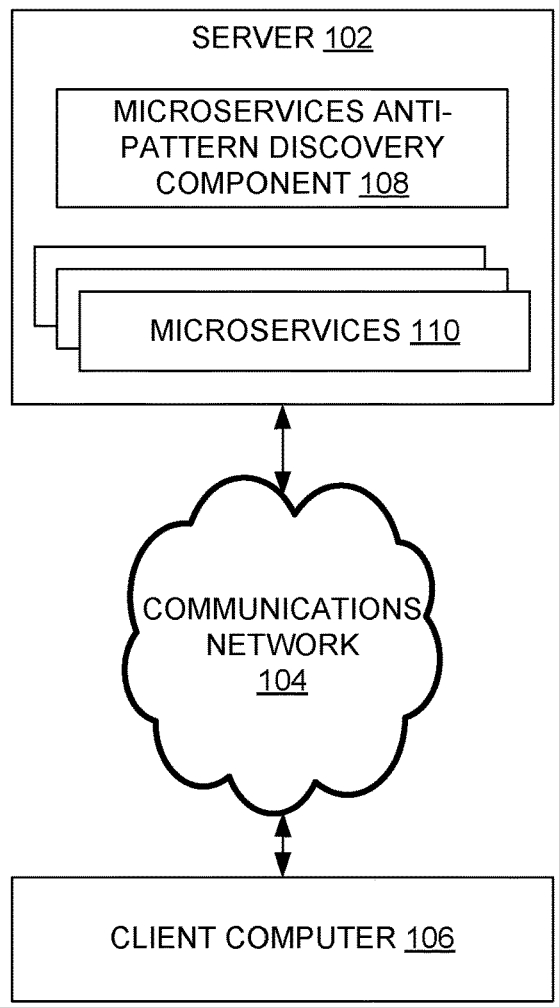
FIG. 1 illustrates an example system architecture that can facilitate microservices anti-pattern discovery, in accordance with an embodiment of this disclosure.

Microservices architectures for computer programs can be implemented because, relative to other techniques, they offer improved agility, faster time to market, and improved scalability. Microservices architectures can bring benefits to organizations in terms of agility and scalability.

In addition to the benefits of microservices architectures, there can also be downsides associated with using microservices architectures. Successfully implementing a microservices architecture can involve following recommended practices and guidelines, and having access to appropriate resources, tools, and technologies.

There are numerous architectural anti-patterns that can be wrongfully implemented in microservices architectures. The present techniques can be implemented to discover and analyze anti-patterns within microservices architecture implementation, so that they can be remedied.

It can be that a microservice is not a standalone component, but rather interacts with other microservices and software elements. A microservices architecture can comprise a grid of interactive components that can be composed correctly to provide good performance over time.

The present techniques analyze issues that can be encountered in cloud engineering regarding design during involvement. The present techniques can be implemented to address common issues that can be inserted into a microservices architecture, and ways that a system can detect, expose, and alert these issues.

Cloud computing platforms can have their own microservices topology. In a topology, there can be patterns, and sometimes, anti-patterns.

Understanding a cloud architecture topology can involve a long investigation, where the scope involves continuously learning associated data flows, e.g., directions, sequences, and content of data flows. This analysis can be time-consuming and difficult.

The present techniques can be implemented to facilitate automatic data analysis that can lead to fast and accurate analysis of microservice topology in a cloud. This analysis can specifically involve finding anti-patterns.

Some prior approaches involve analyzing design documents to deduce an analyzed cloud topology. Some prior approaches involve surveying a hardware topology or container orchestration.

The present techniques can improve upon these prior approaches by constantly analyzing clouds, inferring an associated topology by reading logs or sniffing network data flows, and issuing alerts regarding an existence of anti-patterns found within a microservices architecture.

The present techniques can involve constantly analyzing an existing and active cloud by using well-defined tools, such as logs from the cloud, and network sniffing tools. A topology of the cloud can be determined by those tools, and a system can analyze this topology for anti-patterns.

Where an anti-pattern is detected, an owner of the microservices architecture can be notified of relevant details, such as a description of the anti-pattern, and a suggestion about how the anti-pattern can be solved.

It can be that clouds evolve spontaneously, and in a way that is not always documented. Anti-patterns can be hidden in a microservices topology, and can be challenging for humans to notice.

The present techniques can be implemented to facilitate and catch issues with anti-patterns in preliminary stages, so that they can quickly be analyzed.

A benefit of the present techniques can be continuously analyzing topology of a cloud. The present techniques can be implemented to continuously analyze an active cloud that constantly undergoes changes. An output of this analysis can change along with cloud development, and remain accurate over time.

Another benefit of the present techniques can be finding anti-patterns in a topology of a cloud. From analyzing a cloud topology, it can be possible to find anti-patterns based on interactions between microservices. These anti-patterns can be intercepted in initial stages of microservices architecture development, and an alert can be issued to system architects.

Another benefit of the present techniques can be an ability to integrate them into a continuous improvement (CI)/continuous deployment (CD) process that can improve and sustain a development cycle. An ability to intercept anti-patterns in initial stages of their creation can save time handling potential issues in the cloud and in an architecture refactoring process.

The present techniques can be implemented to use static analysis. In some examples, dynamic interactions between microservices can be analyzed to learn about the content of each of the microservices, their roles and interactions, and an overall picture of the cloud. In some examples, static analysis of microservices can also be performed. Static analysis can include analyzing dependencies, code, configuration files, etc. This static analysis can be performed during development over an integrated development environment (IDE), which can improve anti-pattern handling timing.

The present techniques can be implemented for other forms of performance analysis. The present techniques can be implemented to analyze a time duration of each step and an overall performance of a call; a frequency of use of a scenario; and/or failures to a break in a step.

In some examples, the present techniques can be implemented to aid visualization. The present techniques can illustrate a cloud via graphics and dashboards in a way that can be intuitive to a user.

Example Architectures

FIG. 1 illustrates an example system architecture 100 that can facilitate microservices anti-pattern discovery, in accordance with an embodiment of this disclosure.

System architecture 100 comprises server 102, communications network 104, and client computer 106. In turn, server 102 comprises microservices anti-pattern discovery component 108 and microservices 110.

Figure 15:
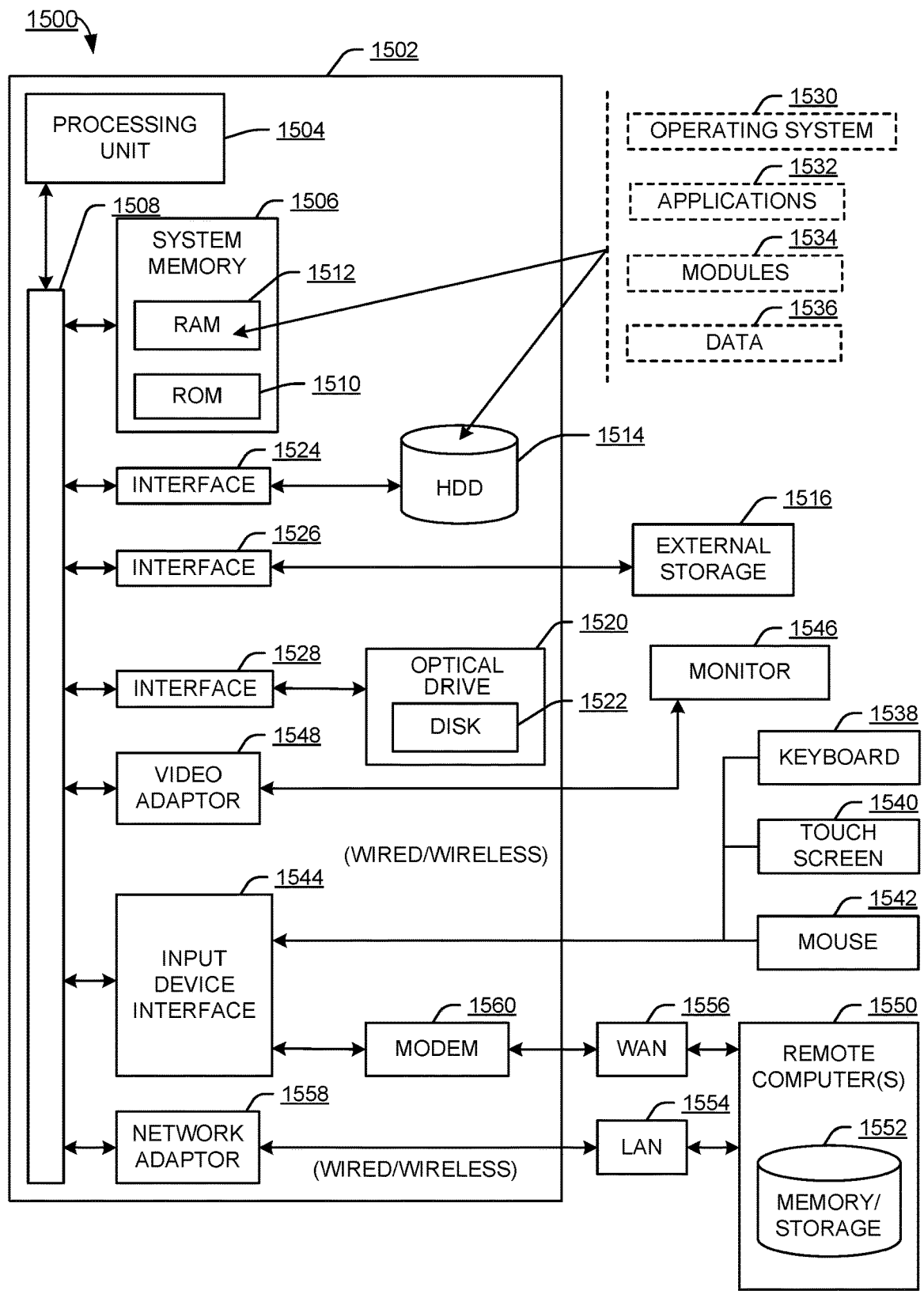
FIG. 15 illustrates an example block diagram of a computer operable to execute an embodiment of this disclosure.

Each of server 102 and/or client computer 106 can be implemented with part(s) of computing environment 1500 of FIG. 15.

Server 102 can provide a computer service that is accessible to client computer 106 via communications network 104. This service can be implemented by microservices 110, which can communicate with each other (as well as external source) to implement the service. It can be that an architecture of how microservices 110 interact exhibits an anti-pattern, and performance of microservices 110 can be improved by refactoring microservices 110 to remove this anti-pattern. Microservices anti-pattern discovery component 108 can analyze communications that involve microservices 110 to identify such an anti-pattern.

In some examples, microservices anti-pattern discovery component 108 can implement part(s) of the process flows of FIGS. 6-14 to implement microservices anti-pattern discovery.

It can be appreciated that system architecture 100 is one example system architecture for microservices anti-pattern discovery, and that there can be other system architectures that facilitate microservices anti-pattern discovery.

Figure 2:
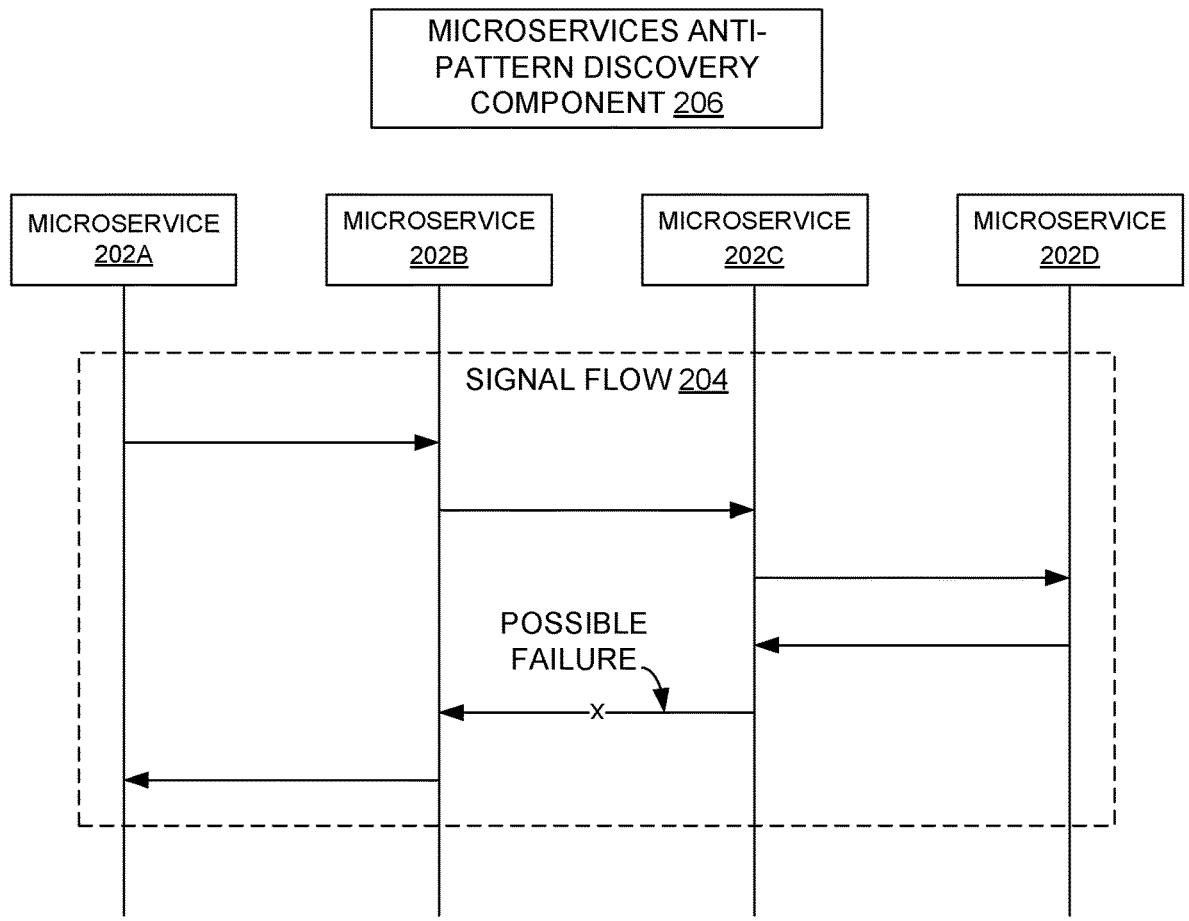
FIG. 2 illustrates an example system architecture in which a waterfall anti-pattern can be identified, and that can facilitate microservices anti-pattern discovery, in accordance with an embodiment of this disclosure.

FIG. 2 illustrates an example system architecture 200 in which a waterfall anti-pattern can be identified, and that can facilitate microservices anti-pattern discovery, in accordance with an embodiment of this disclosure. In some examples, part(s) of system architecture 200 can be implemented by microservices anti-pattern discovery component 108 of FIG. 1 as part of facilitating microservices anti-pattern discovery.

System architecture 200 comprises microservice 202A, microservice 202B, microservice 202C, microservice 202D, signal flow 204, and microservices anti-pattern discovery component 206. Each of microservice 202A, microservice 202B, microservice 202C, and microservice 202D can be similar to a microservice of microservices 110 of FIG. 1. Signal flow 204 can represent a sequence of communications between microservice 202A, microservice 202B, microservice 202C, and microservice 202D. Microservices anti-pattern discovery component 206 can be similar to microservices anti-pattern discovery component 108 of FIG. 1.

System architecture 200 illustrates a waterfall anti-pattern among microservice 202A, microservice 202B, microservice 202C, and microservice 202D, and this waterfall anti-pattern can be identified by microservices anti-pattern discovery component 206. A waterfall anti-pattern can be characterized by a series of microservices that use synchronous calls subsequently to accomplish a single command.

A waterfall anti-pattern can be thought of as creating a monolith. A problem with a waterfall anti-pattern is that it can provide by poor performance, with high latency. Another problem can be resilience, where a break in a single step can break the entire flow.

Figure 3:
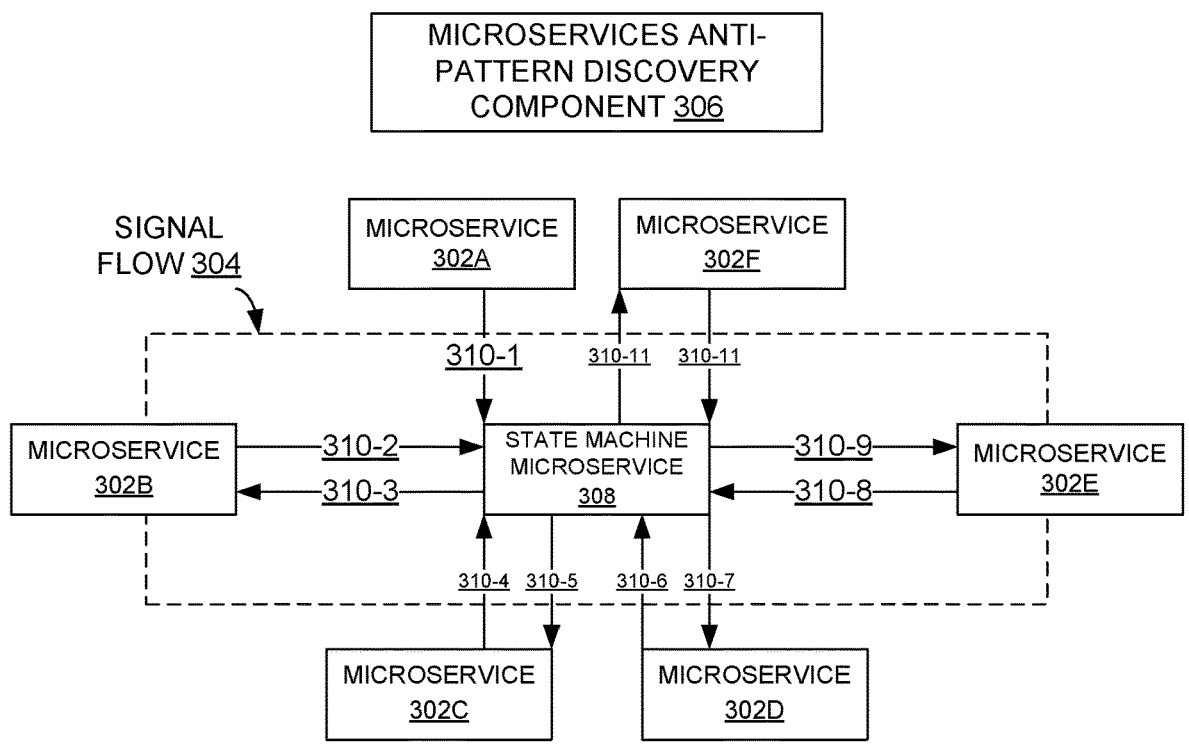
FIG. 3 illustrates an example system architecture in which a state keeper anti-pattern can be identified, and that can facilitate microservices anti-pattern discovery, in accordance with an embodiment of this disclosure.

FIG. 3 illustrates an example system architecture 300 in which a state keeper anti-pattern can be identified, and that can facilitate microservices anti-pattern discovery, in accordance with an embodiment of this disclosure. In some examples, part(s) of system architecture 300 can be implemented by microservices anti-pattern discovery component 108 of FIG. 1 as part of facilitating microservices anti-pattern discovery.

System architecture 300 comprises microservice 302A, microservice 302B, microservice 302C, microservice 302D, microservice 302E, microservice 302F, signal flow 304, microservices anti-pattern discovery component 306, state machine microservice 308, signal 310-1, signal 310-2, signal 310-3, signal 310-4, signal 310-5, signal 310-6, signal 310-7, signal 310-8, signal 310-9, signal 310-10, and signal 310-11.

Each of microservice 302A, microservice 302B, microservice 302C, microservice 302D, microservice 302E, and microservice 302F can be similar to a microservice of microservices 110 of FIG. 1. Signal flow 304 can represent a sequence of communications between microservice 302A, microservice 302B, microservice 302C, microservice 302D, microservice 302E, and microservice 302F. Microservices anti-pattern discovery component 306 can be similar to microservices anti-pattern discovery component 108 of FIG. 1. State machine microservice 310 can be similar to a microservice of microservices 110 of FIG. 1 where the microservice functions as a state machine. Signal 310-1, signal 310-2, signal 310-3, signal 310-4, signal 310-5, signal 310-6, signal 310-7, signal 310-8, signal 310-9, signal 310-10, and signal 310-11 can be signals of signal flow 304, where they occur in the order presented here, from 310-1 to 310-11.

System architecture 300 illustrates a state keeper anti-pattern among microservice 302A, microservice 302B, microservice 302C, microservice 302D, microservice 302E, microservice 302F, and state keeper microservice 310, and this state keeper anti-pattern can be identified by microservices anti-pattern discovery component 306. This anti-pattern can be characterized by one centralized microservice that is responsible for managing and holding a state for some significant process. This anti-pattern can be found in a pattern of flow where several microservices communicate to a centralized microservice, in a repeating sequential order that creates a star shape of calls.

Figure 4:
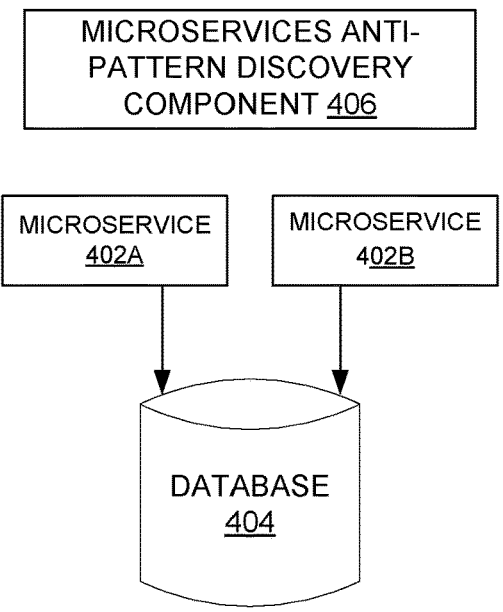
FIG. 4 illustrates an example system architecture in which a shared database anti-pattern can be identified, and that can facilitate microservices anti-pattern discovery, in accordance with an embodiment of this disclosure.

FIG. 4 illustrates an example system architecture 400 in which a shared database anti-pattern can be identified, and that can facilitate microservices anti-pattern discovery, in accordance with an embodiment of this disclosure. In some examples, part(s) of system architecture 400 can be implemented by microservices anti-pattern discovery component 108 of FIG. 1 as part of facilitating microservices anti-pattern discovery.

System architecture 400 comprises microservice 402A, microservice 402B, database 404, and microservices anti-pattern discovery component 406. Each of microservice 402A and microservice 402B can be similar to a microservice of microservices 110 of FIG. 1. Database 404 can comprise a database or datastore that is accessible by each of microservice 402A and microservice 402B. Microservices anti-pattern discovery component 406 can be similar to microservices anti-pattern discovery component 108 of FIG. 1.

System architecture 400 illustrates a shared database anti-pattern among microservice 402A and microservice 402B with regard to database 404, and this shared database anti-pattern can be identified by microservices anti-pattern discovery component 406. In this example, more than one microservice directly uses the same database. This is in contrast to a pattern where there is one owner for a database with one direct use. A shared database anti-pattern can be identified where a database (identified by its name) is used by several microservices and/or a same schema name.

In some examples, a shared database anti-pattern can be identified with regard to components that are not databases. A commonality of these components that can be identified as part of an anti-pattern can be that multiple microservices access a given component. In some examples, this can be a database, an event messaging system, or another component that is not a microservice or part of a cluster in which the microservices operate.

Figure 5:
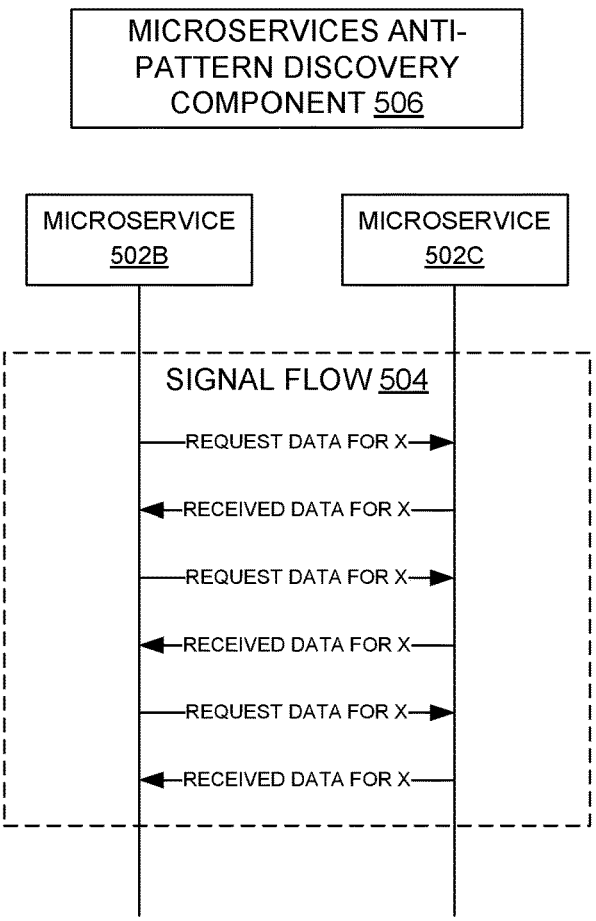
FIG. 5 illustrates an example system architecture in which a recurring identical data extraction anti-pattern can be identified, and that can facilitate microservices anti-pattern discovery, in accordance with an embodiment of this disclosure.

FIG. 5 illustrates an example system architecture 500 in which a recurring identical data extraction anti-pattern can be identified, and that can facilitate microservices anti-pattern discovery, in accordance with an embodiment of this disclosure. In some examples, part(s) of system architecture 500 can be implemented by microservices anti-pattern discovery component 108 of FIG. 1 as part of facilitating microservices anti-pattern discovery.

System architecture 500 comprises microservice 502A, microservice 502B, signal flow 504, and microservices anti-pattern discovery component 506. Each of microservice 502A and microservice 502B can be similar to a microservice of microservices 110 of FIG. 1. Signal flow 504 can represent a sequence of communications between microservice 502A, microservice 502B. Microservices anti-pattern discovery component 506 can be similar to microservices anti-pattern discovery component 108 of FIG. 1.

System architecture 500 illustrates a recurring identical data extraction anti-pattern among microservice 502A and microservice 502B, and this recurring identical data extraction anti-pattern can be identified by microservices anti-pattern discovery component 506. This anti-pattern can identify recurring events of one microservice making a request to another microservice for data according to the same parameters, and where the same data is received as a response. This repeating data flow can unnecessarily overload network traffic.

Example Process Flows

FIG. 6 illustrates an example process flow 600 for data collection, and that can facilitate microservices anti-pattern discovery, in accordance with an embodiment of this disclosure. In some examples, one or more embodiments of process flow 600 can be implemented by microservices anti-pattern discovery component 108 of FIG. 1, or computing environment 1500 of FIG. 15.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Process flow 600 begins with 602, and moves to operation 604. Operation 604 depicts:

$$M=\{C_i \rightarrow C_j \cup E_k \rightarrow C_i \cup C_i \rightarrow E_k | i,j \in \{1 \ldots n\}, k \in \{1 \ldots m\}|\} \forall m \in Mnew \text{ call}$$

That is, A first step in implementing the present techniques according to three-step solution modeling can be data collection. In process flow 600, inter-component communication data can be collected with a persistent storage system (P).

Calls between two components can be defined according to the above equation.

In some examples, each microservice of a microservices architecture can be configured with a proxy component, where other microservices and entities both send calls via their respective proxy and direct calls to respective proxies of respective microservices. A proxy component can identify a call that is sent or received for a purpose of logging calls, as well as forward that call to its destination.

After operation 604, process flow 600 moves to operation 606, operation 608, or operation 610, depending on the type of call observed.

Operation 606 is reached from operation 604 depending on the type of call observed in operation 604. Operation 606 depicts:

$$m: E_k \rightarrow C_i, C_i \in S, E_k \in E$$

This can be is a new flow call that is triggered by an external system that is out of the analysis scope—that is, some component $E_k \in E$. This call can be marked with a unique identifier and counter for flow calls ($u_m$, 1).

After operation 606, process flow 600 moves to operation 612.

Operation 608 is reached from operation 604 depending on the type of call observed in operation 604. Operation 608 depicts:

$$m: C_i \rightarrow E_k, C_i \in S, E_k \in E$$

This can be a call made to an external system, where the call is marked with a unique identifier ($u_m$, 1), where j is taken from the previous call identifier incremented by 1 or zero.

After operation 608, process flow 600 moves to operation 612.

Operation 610 is reached from operation 604 depending on the type of call observed in operation 604. Operation 610 depicts:

$$m: C_j \rightarrow C_i$$

This can be a call where, if $C_i$ is called by $C_j$ where $C_i, C_j \in S$, extract $u_m$ from that call and mark the new call with ($u_m$, 1) identifier while 1 is a counter.

After operation 610, process flow 600 moves to operation 612.

Operation 612 is reached from operation 606, operation 608, and operation 610. Operation 612 depicts:

$$P=P\forall\{u_m,l,r,C_i,C_j\}$$

That is, log response data (r) can be logged for data analysis. Then, a collection of unique identifies, ordinal l, response r, and a calling component identifier can be assigned to P:

After operation 612, process flow 600 moves to 614, where process flow 600 ends.

Figure 7:
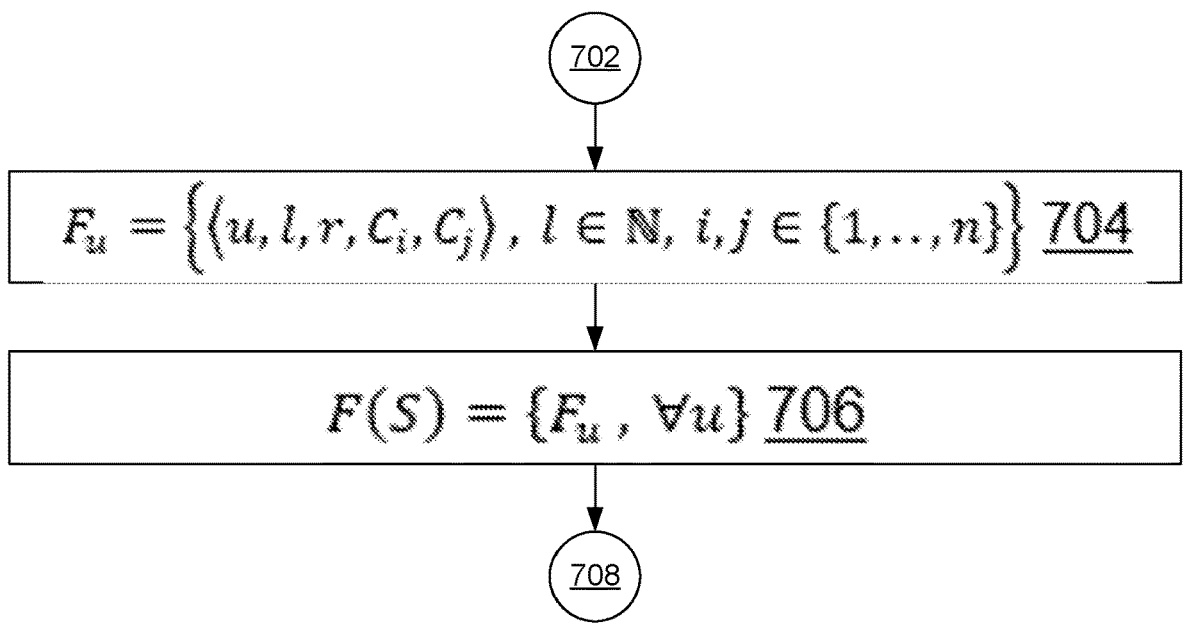
FIG. 7 illustrates an example process flow for flows mapping, and that can facilitate microservices anti-pattern discovery, in accordance with an embodiment of this disclosure.

FIG. 7 illustrates an example process flow 700 for flows mapping, and that can facilitate microservices anti-pattern discovery, in accordance with an embodiment of this disclosure. In some examples, one or more embodiments of process flow 700 can be implemented by microservices anti-pattern discovery component 108 of FIG. 1, or computing environment 1500 of FIG. 15.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Process flow 700 begins with 702, and moves to operation 704. Operation 704 depicts:

$$F_u=\{<u,l,r,C_i,C_j>, l \in \mathbb{N}, i,j \in \{1, \ldots, n)\}\}$$

That is, a second step in implementing the present techniques according to three-step solution modeling can be flows mapping. A single flow can be defined as an ordered collection, where u is a unique identifier.

After operation 704, process flow 700 moves to operation 706.

Operation 706 depicts:

$$F(S)=\{F_u, \forall u\}$$

That is, system S flows can be defined by this group drawn from the flows of operation 704.

After operation 704, process flow 700 moves to 708, where process flow 700 ends.

FIG. 8 illustrates an example process flow 800 for identifying a waterfall anti-pattern, and that can facilitate microservices anti-pattern discovery, in accordance with an embodiment of this disclosure. In some examples, one or more embodiments of process flow 800 can be implemented by microservices anti-pattern discovery component 108 of FIG. 1, or computing environment 1500 of FIG. 15.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Process flow 800 begins with 802, and moves to operation 804. Operation 804 depicts:

$$\text{Waterfall antipattern flows} = \{F_u \in F(S), |F_u| > t\}$$

That is, a third step in implementing the present techniques according to three-step solution modeling can be anti-pattern analysis (such as in FIGS. 8-11). This can take different forms, based on the anti-pattern being identified.

Anti-pattern analysis for a waterfall anti-pattern can be performed as follows. A waterfall anti-pattern can be defined by setting a threshold t, which defines a maximum amount of calls for a specific flow. Then, flows that satisfy the above equation following can be sought out.

After operation 804, process flow 800 moves to operation 806.

Operation 806 depicts:

$$U_{iu} = \{(u,l,r,C_i) \in F_u\}$$

Regarding finding overused components, component usage of Component $C_i$ in flow $F_u$ can be defined according to the above equation.

After operation 806, process flow 800 moves to operation 808.

Operation 808 depicts:

$$\exists u, so |U_{iu}| > t$$

That is, given operation 806, a component $C_i$ can be considered to exhibit an overuse pattern per flow for threshold t where the operation 806 holds This can indicate that there is a unique identifier for which the number of times a component was called exceeds a given threshold.

After operation 806, process flow 800 moves to 808 where process flow 800 ends.

Figure 9:
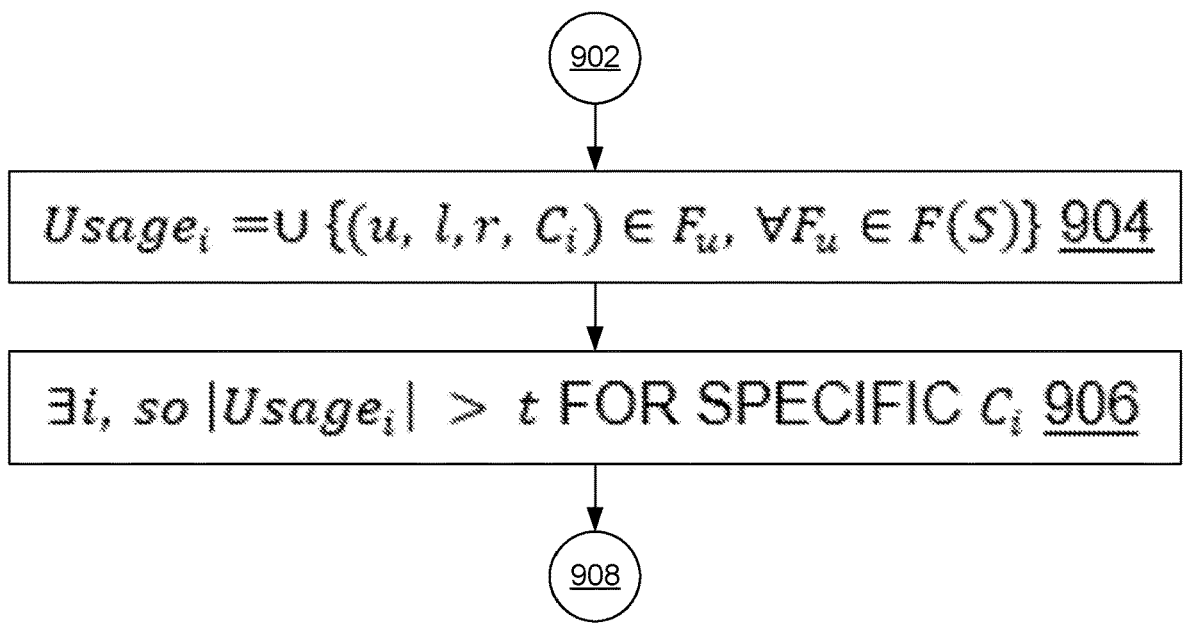
FIG. 9 illustrates an example process flow for identifying a state keeper anti-pattern, and that can facilitate microservices anti-pattern discovery, in accordance with an embodiment of this disclosure.

FIG. 9 illustrates an example process flow 900 for identifying a state keeper anti-pattern, and that can facilitate microservices anti-pattern discovery, in accordance with an embodiment of this disclosure. In some examples, one or more embodiments of process flow 900 can be implemented by microservices anti-pattern discovery component 108 of FIG. 1, or computing environment 1500 of FIG. 15.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, process flow 800 of FIG. 8, process flow 1000 of FIG. 10, process flow 1100 of FIG. 11, process flow 1200 of FIG. 12, process flow 1300 of FIG. 13, and/or process flow 1400 of FIG. 14.

Process flow 900 begins with 902, and moves to operation 904. Operation 804 depicts:

$$\text{Usage}_i = \cup \{(u,l,r,C_i) \in F_u, \forall F_u \in F(S)\}$$

That is, anti-pattern analysis for a state keeper anti-pattern can be performed as follows. Component overuse can be detected for all flows. Component $C_i$ usage over S as can be defined according to this equation of operation 904.

After operation 904, process flow 900 moves to operation 906.

Operation 906 depicts:

$$\exists i, so |\text{Usage}_i| > t \text{ for specific } C_i$$

That is, a component over usage pattern over S for threshold t can exist where this is true.

In some examples, the threshold can be limited per time frame.

After operation 906, process flow 900 moves to 908 where process flow 900 ends.

Figure 10:
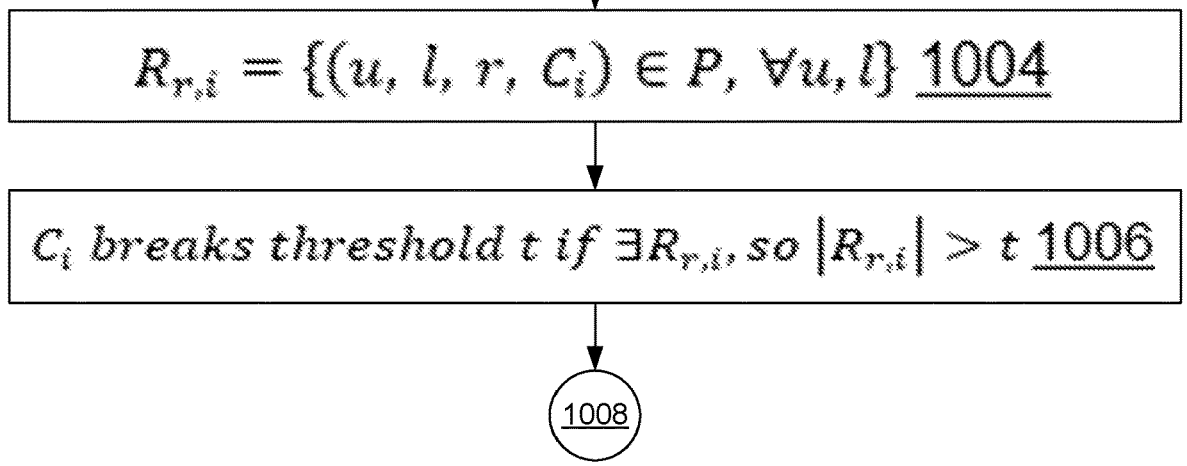
FIG. 10 illustrates an example process flow for identifying a shared database anti-pattern, and that can facilitate microservices anti-pattern discovery, in accordance with an embodiment of this disclosure.

FIG. 10 illustrates an example process flow 1000 for identifying a shared database anti-pattern, and that can facilitate microservices anti-pattern discovery, in accordance with an embodiment of this disclosure. In some examples, one or more embodiments of process flow 1000 can be implemented by microservices anti-pattern discovery component 108 of FIG. 1, or computing environment 1500 of FIG. 15.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 700 of FIG. 7, process flow 800 of FIG. 8, process flow 900 of FIG. 9, process flow 1100 of FIG. 11, process flow 1200 of FIG. 12, process flow 1300 of FIG. 13, and/or process flow 1400 of FIG. 14.

Process flow 1000 begins with 1002, and moves to operation 1004. Operation 1004 depicts:

$$R_{r,i} = \{(u,l,r,C_i) \in P, \forall u,l)\}$$

Anti-pattern analysis for a recurring identical data extraction anti-pattern can be performed as follows. A threshold t can be defined for recurring data extraction. A same response collection f for component $C_i$ can be defined with the above equation.

After operation 1004, process flow 1000 moves to operation 1006.

Operation 1006 depicts:

$$C_i \text{ breaks threshold } t \text{ if } \exists_{r,i}, so |R_{r,i}| > t$$

That is, a component can break threshold t where the above is true.

In some examples, the threshold can be limited per time frame.

After operation 1006, process flow 1000 moves to 1008 where process flow 1000 ends.

Figure 11:
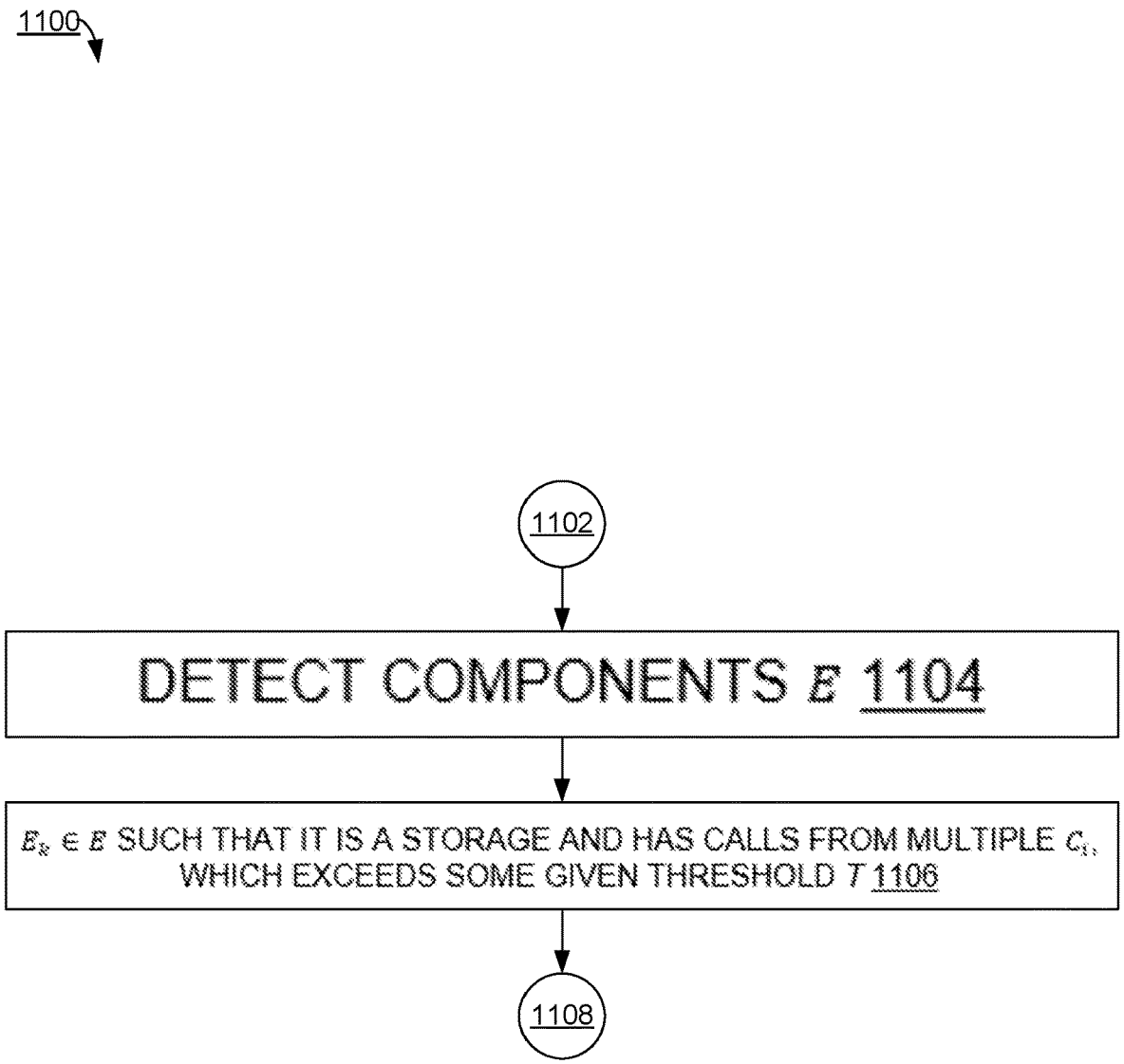
FIG. 11 illustrates an example process flow for identifying a recurring identical data extraction anti-pattern, and that can facilitate microservices anti-pattern discovery, in accordance with an embodiment of this disclosure.

FIG. 11 illustrates an example process flow 1100 for identifying a recurring identical data extraction anti-pattern, and that can facilitate microservices anti-pattern discovery, in accordance with an embodiment of this disclosure. In some examples, one or more embodiments of process flow 1100 can be implemented by microservices anti-pattern discovery component 118 of FIG. 1, or computing environment 1500 of FIG. 15.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 600 of FIG. 6, process flow 700 of FIG. 7, process flow 800 of FIG. 8, process flow 900 of FIG. 9, process flow 1000 of FIG. 10, process flow 1200 of FIG. 12, process flow 1300 of FIG. 13, and/or process flow 1400 of FIG. 14.

Process flow 1100 begins with 1102, and moves to operation 1104. Operation 1004 depicts:

Detect components $E$

Anti-pattern analysis for a shared database anti-pattern can be performed as follows. First, components can be detected.

After operation 1104, process flow 1100 moves to operation 1106.

Operation 1106 depicts:

$E_k \in E$ such that it is *a* storage and *has* calls from multiple $C_i$, which exceeds some given threshold $t$ That is, $E_k \in E$ can be detected such that it is a storage and has calls from multiple $C_i$, which exceeds some given threshold t.

After operation 1106, process flow 1100 moves to 1108 where process flow 1100 ends.

Figure 12:
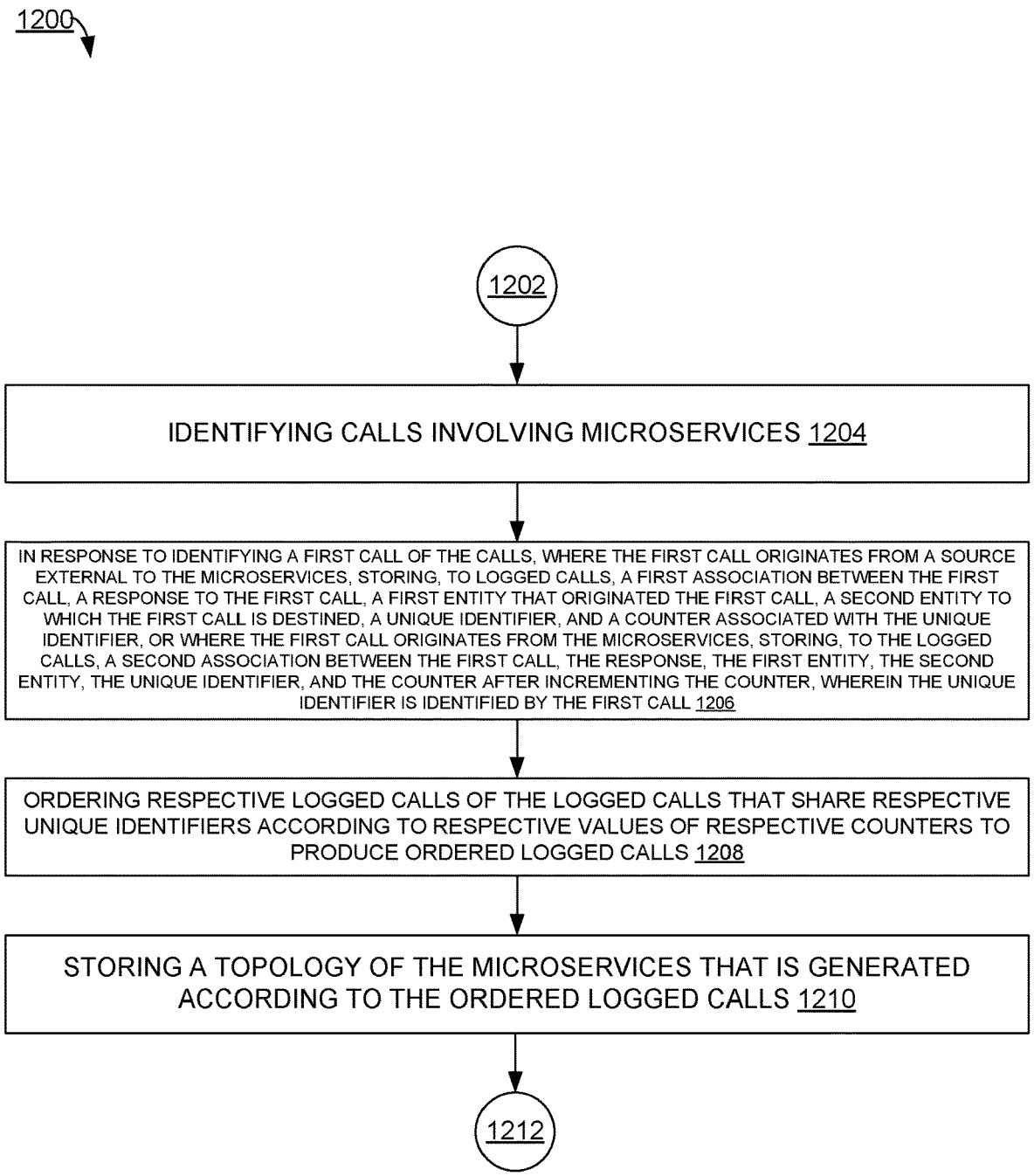
FIG. 12 illustrates an example process flow for microservices anti-pattern discovery, in accordance with an embodiment of this disclosure.

FIG. 12 illustrates an example process flow 1200 for microservices anti-pattern discovery, in accordance with an embodiment of this disclosure. In some examples, one or more embodiments of process flow 1200 can be implemented by microservices anti-pattern discovery component 128 of FIG. 1, or computing environment 1500 of FIG. 15.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1300 of FIG. 13, and/or process flow 1400 of FIG. 14.

Process flow 1200 begins with 1202, and moves to operation 1204. Operation 1204 depicts identifying calls involving microservices. In some examples, this can comprise microservices anti-pattern discovery component 108 of FIG. 1 identifying calls that are sent to a microservice of microservices 110. These calls can be originated from within microservices 110 or from a source external to microservices 110.

After operation 1204, process flow 1200 moves to operation 1206.

Operation 1206 depicts, in response to identifying a first call of the calls, where the first call originates from a source external to the microservices, storing, to logged calls, a first association between the first call, a response to the first call, a first entity that originated the first call, a second entity to which the first call is destined, a unique identifier, and a counter associated with the unique identifier, or where the first call originates from the microservices, storing, to the logged calls, a second association between the first call, the response, the first entity, the second entity, the unique identifier, and the counter after incrementing the counter, wherein the unique identifier is identified by the first call.

That is, each call identified in operation 1204 can be tagged (e.g., with a unique identifier and an ordinal value) and logged. This tagging and logging can be performed with different conditions based on whether the call originated external or internal to the microservices.

After operation 1206, process flow 1200 moves to operation 1208.

Operation 1208 depicts ordering respective logged calls of the logged calls that share respective unique identifiers according to respective values of respective counters to produce ordered logged calls. That is, the logged calls can be sorted according to their flows (via a unique identifier), as well as within those flows (via an ordinal value).

After operation 1208, process flow 1200 moves to operation 1210.

Operation 1210 depicts storing a topology of the microservices that is generated according to the ordered logged calls. That is, a topology of the microservices architecture can be generated based on the sorted call.

In some examples storing the topology of the microservices results in a stored topology, and operation 1210 comprises identifying a defined design pattern of an architecture of the microservices from the stored topology. That is, the topology of microservices that is determined can be used to identify anti-patterns within the microservices architecture.

In some examples, storing the topology of the microservices results in a stored topology, the unique identifier is a first unique identifier, and operation 1210 comprises identifying a defined design pattern of an architecture of the microservices from the stored topology in response to determining that a first number of first logged calls of the logged calls exceeds a first defined threshold value, wherein the first logged calls are associated with a same unique identifier that comprises the first unique identifier or a second unique identifier. In some examples where this is present, the defined design pattern comprises a waterfall anti-pattern. That is, a waterfall anti-pattern can be identified where too many calls (relative to a predetermined amount of calls) are made in one flow.

In some examples, storing the topology of the microservices results in a stored topology, the unique identifier is a first unique identifier, and operation 1210 comprises identifying a defined design pattern of an architecture of the microservices from the stored topology in response to determining that a first number of first logged calls of the logged calls exceeds a first defined threshold value, wherein the first logged calls are associated with a same unique identifier that comprises the first unique identifier or a second unique identifier, and wherein the first logged calls are directed to a first microservice of the microservices. In some examples, the defined design pattern comprises a waterfall anti-pattern. That is, a waterfall anti-pattern can be identified where too one component is called too many times (relative to a predetermined amount of calls) in one flow.

In some examples, storing the topology of the microservices results in a stored topology, and operation 1210 comprises identifying a defined design pattern of an architecture of the microservices from the stored topology in response to determining that a first number of first logged calls of the logged calls exceeds a first defined threshold value, wherein the first logged calls are directed to a first microservice of the microservices. In some examples, the defined design pattern comprises a state keeper anti-pattern. That is, a state keeper anti-pattern can be identified where there are too many calls (relative to a predetermined amount of calls) is made to one microservice.

In some examples, determining that the first number of the first logged calls exceeds the first defined threshold value is performed for a defined time period. That is, determining whether a limit threshold is reached can be performed for a given time frame.

After operation 1210, process flow 1200 moves to 1212, where process flow 1200 ends.

Figure 13:
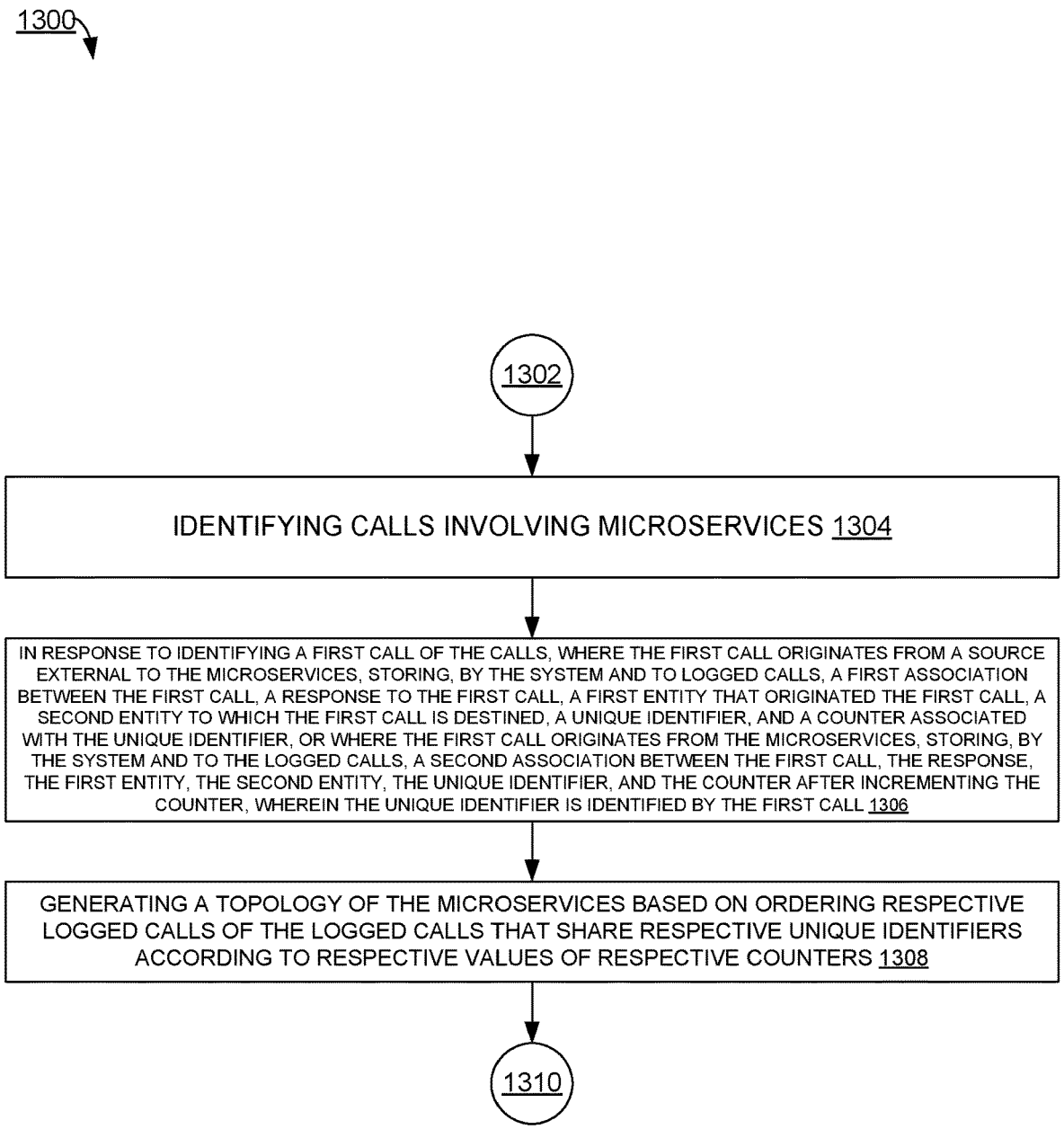
FIG. 13 illustrates another example process flow for microservices anti-pattern discovery, in accordance with an embodiment of this disclosure.

FIG. 13 illustrates another example process flow 1300 for microservices anti-pattern discovery, in accordance with an embodiment of this disclosure. In some examples, one or more embodiments of process flow 1300 can be implemented by microservices anti-pattern discovery component 138 of FIG. 1, or computing environment 1500 of FIG. 15.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, and/or process flow 1400 of FIG. 14.

Process flow 1300 begins with 1302, and moves to operation 1304. Operation 1304 depicts identifying calls involving microservices. In some examples, operation 1304 can be implemented in a similar manner as operation 1204 of FIG. 12.

After operation 1304, process flow 1300 moves to operation 1306.

Operation 1306 depicts, in response to identifying a first call of the calls, where the first call originates from a source external to the microservices, storing, by the system and to logged calls, a first association between the first call, a response to the first call, a first entity that originated the first call, a second entity to which the first call is destined, a unique identifier, and a counter associated with the unique identifier, or where the first call originates from the microservices, storing, by the system and to the logged calls, a second association between the first call, the response, the first entity, the second entity, the unique identifier, and the counter after incrementing the counter, wherein the unique identifier is identified by the first call. In some examples, operation 1306 can be implemented in a similar manner as operation 1206 of FIG. 12.

After operation 1306, process flow 1300 moves to operation 1308.

Operation 1308 depicts generating a topology of the microservices based on ordering respective logged calls of the logged calls that share respective unique identifiers according to respective values of respective counters. In some examples, operation 1308 can be implemented in a similar manner as operations 1208-1210 of FIG. 12.

In some examples, storing the topology of the microservices results in a stored topology, and operation 1308 comprises identifying a defined design pattern of an architecture of the microservices from the stored topology in response to determining that a first number of first logged calls of the logged calls exceeds a first defined threshold value, wherein the first logged calls are originated by a first microservice of the microservices, and wherein respective responses of the first logged calls are the same. In some examples, the defined design pattern comprises a recurring identical data extraction anti-pattern. That is, a recurring identical data extraction anti-pattern can be identified where one microservice makes too many calls (relative to a predefined threshold amount of calls) that result in that microservice retrieving the same information with each call.

In some examples, determining that the first number of the first logged calls exceeds the first defined threshold value is performed for a defined time period. That is, determining whether a limit threshold is reached can be performed for a given time frame.

In some examples, storing the topology of the microservices results in a stored topology, the source external to the microservices is a first source, and operation 1308 comprises identifying a defined design pattern of an architecture of the microservices from the stored topology in response to determining that a first number of first logged calls of the logged calls exceeds a first defined threshold value, and wherein the first logged calls are directed to an external source that comprises the first source or a second source external to the microservices. In some examples, this comprises determining that the external source provides data storage resources to the microservices. In some examples, the defined design pattern comprises a shared database anti-pattern. That is, a shared database anti-pattern can be identified where too many calls (relative to a predetermined number of calls) are directed to a particular external source, and this external source can be a database.

After operation 1308, process flow 1300 moves to 1310, where process flow 1300 ends.

FIG. 14 illustrates another example process flow 1400 for microservices anti-pattern discovery, in accordance with an embodiment of this disclosure. In some examples, one or more embodiments of process flow 1400 can be implemented by microservices anti-pattern discovery component 148 of FIG. 1, or computing environment 1500 of FIG. 15.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of one or more of process flow 600 of FIG. 6, process flow 700 of FIG. 7, process flow 800 of FIG. 8, process flow 900 of FIG. 9, process flow 1000 of FIG. 10, process flow 1100 of FIG. 11, process flow 1200 of FIG. 12, and/or process flow 1300 of FIG. 13.

Process flow 1400 begins with 1402, and moves to operation 1404. Operation 1404 depicts, for a first call of calls involving microservices, where the first call originates from a source external to the microservices, storing, to logged calls, a first association between the first call, a first entity that originated the first call, a second entity to which the first call is destined, a unique identifier, and a counter associated with the unique identifier, or where the first call originates from the microservices, storing, to the logged calls, a second association between the first call, the first entity, the second entity, the unique identifier, and the counter after incrementing the counter, wherein the unique identifier is identified by the first call. In some examples, operation 1404 can be implemented in a similar manner as operation 1206 of FIG. 12.

In some examples, storing the first association comprises storing a response to the first call, and storing the second association comprises storing the response to the first call. That is, logging the response to a call can be performed.

After operation 1404, process flow 1400 moves to operation 1406.

Operation 1406 depicts generating a topology of the microservices based on the logged calls. In some examples, operation 1406 can be implemented in a similar manner as operation 1210 of FIG. 12.

In some examples, generating the topology of the microservices results in a generated topology, and operation 1406 comprises identifying a defined design pattern of an architecture of the microservices from the stored topology. That is, the generated topology can be used to identify anti-patterns.

In some examples, operation 1406 comprises ordering respective logged calls of the logged calls that share respective unique identifiers according to respective values of respective counters. That is, the logged calls in operation 1404 can be used to generate the topology in operation 1406.

After operation 1406, process flow 1400 moves to 1408, where process flow 1400 ends.

Example Operating Environment

In order to provide additional context for various embodiments described herein, FIG. 15 and the following discussion are intended to provide a brief, general description of a suitable computing environment 1500 in which the various embodiments of the embodiment described herein can be implemented.

For example, parts of computing environment 1500 can be used to implement one or more embodiments of server 102, communications network 104, and/or client computer 106 of FIG. 1.

In some examples, computing environment 1500 can implement one or more embodiments of the process flows of FIGS. 6-14 to facilitate microservices anti-pattern discovery.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a nonvolatile storage such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory coupled to the processor, comprising instructions that cause the processor to perform operations comprising:
        identifying calls involving microservices;
        in response to identifying a first call of the calls,
            where the first call originates from a source external to the microservices, storing, to logged calls, a first association between the first call, a response to the first call, a first entity that originated the first call, a second entity to which the first call is destined, a unique identifier, and a counter associated with the unique identifier, or
            where the first call originates from the microservices, storing, to the logged calls, a second association between the first call, the response, the first entity, the second entity, the unique identifier, and the counter after incrementing the counter, wherein the unique identifier is identified by the first call;
        ordering respective logged calls of the logged calls that share respective unique identifiers according to respective values of respective counters to produce ordered logged calls; and
        storing a topology of the microservices that is generated according to the ordered logged calls.

2. The system of claim 1, wherein storing the topology of the microservices results in a stored topology, and wherein the operations further comprise:
    identifying a defined design pattern of an architecture of the microservices from the stored topology.

3. The system of claim 1, wherein storing the topology of the microservices results in a stored topology, wherein the unique identifier is a first unique identifier, and wherein the operations further comprise:
    identifying a defined design pattern of an architecture of the microservices from the stored topology in response to determining that a first number of first logged calls of the logged calls exceeds a first defined threshold value, wherein the first logged calls are associated with a same unique identifier that comprises the first unique identifier or a second unique identifier.

4. The system of claim 3, wherein the defined design pattern comprises a waterfall anti-pattern.

5. The system of claim 1, wherein storing the topology of the microservices results in a stored topology, wherein the unique identifier is a first unique identifier, and wherein the operations further comprise:
    identifying a defined design pattern of an architecture of the microservices from the stored topology in response to determining that a first number of first logged calls of the logged calls exceeds a first defined threshold value, wherein the first logged calls are associated with a same unique identifier that comprises the first unique identifier or a second unique identifier, and wherein the first logged calls are directed to a first microservice of the microservices.

6. The system of claim 5, wherein the defined design pattern comprises a waterfall anti-pattern.

7. The system of claim 1, wherein storing the topology of the microservices results in a stored topology, and wherein the operations further comprise:
    identifying a defined design pattern of an architecture of the microservices from the stored topology in response to determining that a first number of first logged calls of the logged calls exceeds a first defined threshold value, wherein the first logged calls are directed to a first microservice of the microservices.

8. The system of claim 7, wherein determining that the first number of the first logged calls exceeds the first defined threshold value is performed for a defined time period.

9. The system of claim 7, wherein the defined design pattern comprises a state keeper anti-pattern.

10. A method, comprising:
    identifying, by a system comprising a processor, calls involving microservices;
    in response to identifying a first call of the calls,
        where the first call originates from a source external to the microservices, storing, by the system and to logged calls, a first association between the first call, a response to the first call, a first entity that originated the first call, a second entity to which the first call is destined, a unique identifier, and a counter associated with the unique identifier, or
        where the first call originates from the microservices, storing, by the system and to the logged calls, a second association between the first call, the response, the first entity, the second entity, the unique identifier, and the counter after incrementing the counter, wherein the unique identifier is identified by the first call; and
    generating, by the system, a topology of the microservices based on ordering respective logged calls of the logged calls that share respective unique identifiers according to respective values of respective counters.

11. The method of claim 10, wherein storing the topology of the microservices results in a stored topology, and further comprising:

identifying a defined design pattern of an architecture of the microservices from the stored topology in response to determining, by the system, that a first number of first logged calls of the logged calls exceeds a first defined threshold value, wherein the first logged calls are originated by a first microservice of the microservices, and wherein respective responses of the first logged calls are the same.

12. The method of claim 11, wherein determining that the first number of the first logged calls exceeds the first defined threshold value is performed for a defined time period.

13. The method of claim 11, wherein the defined design pattern comprises a recurring identical data extraction anti-pattern.

14. The method of claim 10, wherein storing the topology of the microservices results in a stored topology, wherein the source external to the microservices is a first source, and further comprising:
identifying a defined design pattern of an architecture of the microservices from the stored topology in response to determining, by the system, that a first number of first logged calls of the logged calls exceeds a first defined threshold value, and wherein the first logged calls are directed to an external source that comprises the first source or a second source external to the microservices.

15. The method of claim 14, further comprising:
determining, by the system, that the external source provides data storage resources to the microservices.

16. The method of claim 14, wherein the defined design pattern comprises a shared database anti-pattern.

17. A non-transitory computer-readable medium comprising instructions that, in response to execution, cause a system comprising a processor to perform operations, comprising:
for a first call of calls involving microservices,
where the first call originates from a source external to the microservices, storing, to logged calls, a first association between the first call, a first entity that originated the first call, a second entity to which the first call is destined, a unique identifier, and a counter associated with the unique identifier, or
where the first call originates from the microservices, storing, to the logged calls, a second association between the first call, the first entity, the second entity, the unique identifier, and the counter after incrementing the counter, wherein the unique identifier is identified by the first call; and
generating a topology of the microservices based on the logged calls.

18. The non-transitory computer-readable medium of claim 17, wherein generating the topology of the microservices results in a generated topology, and wherein the operations further comprise:
identifying a defined design pattern of an architecture of the microservices from the generated topology.

19. The non-transitory computer-readable medium of claim 17, wherein storing the first association comprises storing a response to the first call, and wherein storing the second association comprises storing the response to the first call.

20. The non-transitory computer-readable medium of claim 17, wherein generating the topology of the microservices based on the logged calls comprises:
ordering respective logged calls of the logged calls that share respective unique identifiers according to respective values of respective counters.

* * * * *